United States Patent
Fermann et al.

(10) Patent No.: US 6,765,725 B1
(45) Date of Patent: Jul. 20, 2004

(54) FIBER PIGTAILED HIGH POWER LASER DIODE MODULE WITH HIGH BRIGHTNESS

(75) Inventors: Martin E. Fermann, Franklin, MA (US); Valery Kozlov, Sharon, MA (US); Douglas Bull, Franklin, MA (US)

(73) Assignee: Boston Laser, Inc., Binghamton, NY (US)

( * ) Notice: Subject to any disclaimer, the term of this patent is extended or adjusted under 35 U.S.C. 154(b) by 0 days.

(21) Appl. No.: 09/973,793

(22) Filed: Oct. 11, 2001

(51) Int. Cl.[7] .......................... G02B 27/10; G02B 27/14
(52) U.S. Cl. ........................................ 359/618; 359/636
(58) Field of Search ................................ 359/618, 629, 359/636, 836, 839, 850, 853, 838

(56) References Cited

U.S. PATENT DOCUMENTS

| | | | |
|---|---|---|---|
| 4,362,361 A | * 12/1982 | Campbell et al. | ........... 359/629 |
| 4,828,357 A | 5/1989 | Arata et al. | |
| 5,263,036 A | 11/1993 | De Bernardi et al. | |
| 5,321,718 A | 6/1994 | Waarts et al. | |
| 5,369,661 A | 11/1994 | Yamaguchi et al. | |
| 5,442,787 A | * 8/1995 | Steiner | ........................ 359/629 |
| 5,825,551 A | 10/1998 | Clarkson et al. | |
| 5,877,898 A | 3/1999 | Hollemann et al. | |
| 5,887,096 A | 3/1999 | Du et al. | |
| 5,999,320 A | * 12/1999 | Shirasaki | ..................... 359/839 |
| 6,075,912 A | 6/2000 | Goodman | |
| 6,154,480 A | 11/2000 | Magnusson et al. | |
| 6,243,209 B1 | * 6/2001 | Howells | ..................... 359/636 |
| 6,243,407 B1 | 6/2001 | Mooradian | |
| 6,377,410 B1 | * 4/2002 | Wang et al. | ................. 359/850 |

* cited by examiner

*Primary Examiner*—Ricky Mack
*Assistant Examiner*—Alicia M. Harrington
(74) *Attorney, Agent, or Firm*—Fulbright & Jaworski, LLP

(57) ABSTRACT

A partially mirror coated parallelepipedal form is oriented to divide collimated beams along the longitudinal axes from a plurality of diode lasers arranged side-by-side along their transverse axis. The divided partial beams are subsequently recombined and arranged side-by-side along their transverse axis using the same rhomboidal form, where the parallelepipedal form and the polarization state of the collimated diode laser beams are oriented to minimize the insertion loss of the device. The side by side arranged partial beams are further coupled into an optical fiber positioned downstream of the parallelepipedal form to deliver a beam with high optical brightness.

16 Claims, 7 Drawing Sheets

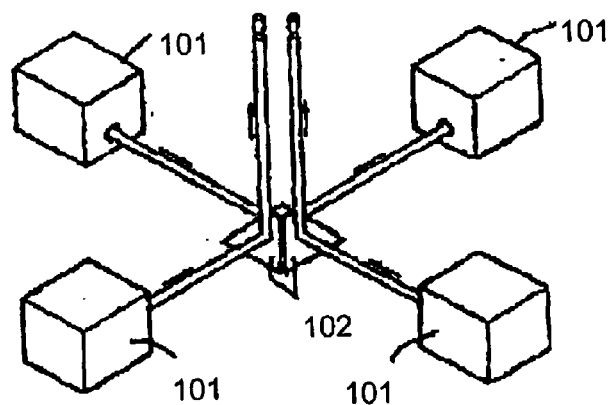
Prior Art        Figure 1
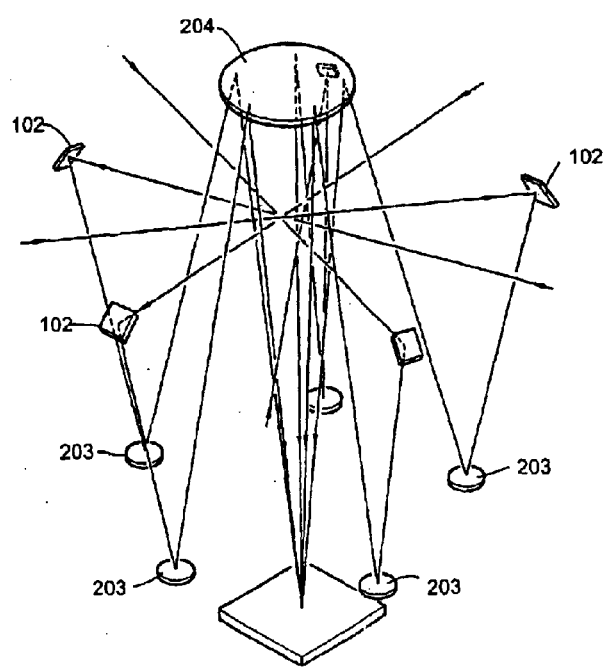
Prior Art        Figure 2

FIBER PIGTAILED HIGH POWER LASER DIODE MODULE WITH HIGH BRIGHTNESS

FIELD OF THE INVENTION

This invention relates to a beam shaping apparatus for laser diodes and, move particularly, to a device used for combining a plurality of laser beams emitted from a plurality of laser diodes to produce a single laser beam with high brightness.

DESCRIPTION OF THE PRIOR ART

As is well known in the state of the art, a conventional "high power" laser diode output beam has a relatively low brightness (brightness is equal to the ratio between beam power and product of beam area and beam solid angle) for many applications. In part, this is because the light emitting area of high power laser diodes has a very asymmetrical, rectangular form with typical width of approximately 1 $\mu$m for most devices and a length of approximately 50–400 $\mu$m. The long (i.e., length) and short (ie., width) axes are generally referred to as slow and fast axis respectively. In addition, the laser diode beam divergence is very different for the slow axis (full width at half maximum FWHM~8 degrees) and for the fast axis (FWHM~40 degrees).

However, for many practical applications of laser diodes it is necessary to have a spatially symmetric output beam with uniform divergence and increased power (i.e., increased intensity or brightness).

One method of obtaining a symmetrical output beam is by coupling a laser diode into an optical fiber, i.e., by fiber pig-tailing. A beam with increased brightness can be achieved by coupling more than one laser diode into the same fiber. The smaller the fiber core diameter, the higher the brightness at the output of the fiber pigtail. However, the asymmetrical form and divergence of a laser diode output beam require the use of an optical coupling system between the laser diode and the input fiber end. Two basic approaches were previously implemented to attempt to overcome this problem.

The first approach relies on a pair of asymmetrical polymorphic or cylindrical lenses to compensate spatial and angular asymmetries of the laser diode output beam and then uses a spherical lens to focus the radiation into a fiber core (see, for example, U.S. Pat. No. 5,321,718 to Lang et al. and U.S. Pat. No. 5,369,661 to Yamaguchi, both of which are incorporated herein by reference in their entirety). This approach only collimates the output beam of the laser diode, leaving the rectangular form of the beam substantially unchanged.

The second approach uses an optical apparatus to deflect the laser diode output beam wave front in various ways (to make it more symmetrical) to enable focusing of the radiation into a fiber. This optical apparatus can be implemented on its own or in addition to an asymmetrical lens pair. The second approach may be used with a single laser diode or in conjunction with several separate laser diodes, which are coupled into the same optical fiber.

An example of a device using several separate laser diodes was discussed in U.S. Pat. No. 6,075,912 to Goodman, incorporated herein by reference in its entirety. In the approach suggested by Goodman, the beams of several diodes are brought into close proximity via reflection at one common mirror. However, the Goodman system leaves the beam of each individual laser diode essentially undisturbed, resulting in practical limitations for a minimum spot size of a resulting output beam.

Another implementation of the second approach (U.S. Pat. No. 4,828,357 to Arata et al., incorporated herein by reference in its entirety) includes an apparatus producing a high power laser beam including (see FIGS. 1 and 2 herein) a plurality of lasers 101 and directing mirrors 102, a plurality of reflecting mirrors 203 and a central focusing mirror 204 for focusing the resultant laser beam into one focal point. Note that in this approach the polarization of the pump beam is not preserved. Moreover, generally, a plurality of reflecting mirrors is employed, complicating the setup. Equally, the beam of each individual laser diode remains essentially undisturbed, which produces practical limitations for the minimum spot size of the resulting output beam.

Yet another variation of the second approach is disclosed in U.S. Pat. No. 5,263,036 to De Bernardi et al. (incorporated herein by reference in its entirety) in which an improved efficiency of combining laser beams is achieved through the use of suitably positioned dichroic mirrors 301 and laser diodes 302 (see, e.g., FIG. 3 herein). The limitation of this technique is again that the beam of each individual laser diode remains substantially undisturbed which results in practical limitations on the minimum achievable spot size of the resulting beam. Moreover, the disclosure addresses direct launching of pumping radiation only into an active multimode optical waveguide containing an active monomode region, a technique which complicates the pumping arrangement.

U.S. Pat. No. 5,877,898 to Holleman et al. (incorporated herein by reference in its entirety) as depicted in FIG. 4 herein proposes to divide and recombine the collimated beams from several laser diodes to obtain a more symmetrical output beam. However, Holleman et al. rely on beam rotation to obtain an improved geometry of the output beam. As one skilled in the art would appreciate, beam rotation is very difficult to realize in practice. In this particular example several separate micro-optic elements are incorporated; i.e., first an optical beam is divided up into several smaller beams, then beam rotation is implemented for all of the individual beams and finally, the rotated beams are recombined before they are focused into an optical fiber. In the scheme by Holleman no provisions are made to obtain polarization sensitive operation. Moreover no explicit minimization of backreflections from the beam dividing and recombining optical elements is accomplished; i.e., the optical surfaces from the beam dividing and recombining elements are incorporated at an angle close to 90° with respect to the input beam.

Another variation of the second approach is discussed in U.S. Pat. No. 5,825,551 to Neilson et al. (incorporated herein by reference in its entirety). As shown in FIG. 5 herein, the beam 501 from a single laser device is collimated and then sent through an optical 'beam shaping' apparatus 502. The beam shaping apparatus contains two substantially parallel reflecting surfaces 503, 504 to effectively rotate the extension of the laser device by 90° while not rotating the orientation of the divergence angles of the output beam from the laser device. However, no provisions are made to minimize the beam size of a single broad stripe laser diode or to minimize the beam size of more than one laser device. Moreover, no provisions are included to optimize the transmission through the 'beam shaper' depending on the polarization state of the light incident to the beam shaper.

Accordingly, a need exists for an improved method of producing the smallest cross section from a laser beam and system for addressing laser diode asymmetries in both single and multiple laser diode systems.

SUMMARY OF THE INVENTION

An object of the invention is to provide a novel integrated arrangement by which the radiation of a plurality of laser diode light emitting areas is so combined and shaped that the combined beam bundle has a reduced and, preferably the smallest possible cross section with reduced and preferably the least possible asymmetry and far-field divergence. The beam shaping arrangement is further configured to minimize its size and insertion loss depending on the polarization state of the input beam from the plurality of laser diode light emitting areas.

This objective is met in an arrangement in accordance with the invention, i.e., an arrangement for combining and shaping the radiation of a plurality of laser diode light emitting areas comprising at least one laser diode whose radiation has a cross section in the emission plane (x-y plane) with a longitudinal axis which is much greater than in the transverse axis. The invention may further include for each laser diode a collimator unit in the radiation direction. A combining unit may be used to combine the collimated radiation of the individual laser diode light emitting areas by means of a side-by-side arrangement in the direction of the transverse axis. A low loss polarization sensitive single element recombining unit divides the combined radiation in the direction of the longitudinal axes into individual partial beams and recombines the latter by means of a side-by-side arrangement in the direction of the transverse axes.

The invention is based on the selection and sequence of the arrangement of optical means for collimating, deflecting, polarizing, backreflection suppression, dividing and combining the radiation from a plurality of laser diode output beams to form a beam bundle. For this purpose, the following optical elements and sub-elements (expressed in the form of optical means) may be arranged in the following sequence in the direction of primary radiation propagation:

Means for collimating the radiation of the laser diode output beams (e.g., a collimator unit);

Means for combining the collimated beams by means of a side-by-side arrangement in the direction of the transverse axis of the beams (e.g., a combining unit);

Means for dividing the combined radiation in the direction of the longitudinal axis of the radiation;

Means for polarizing the input beam;

Means for minimizing back-reflections; and

Means for deflecting the partial beam bundles in order to recombine these partial beam bundles in a side-by-side arrangement in the direction of the transverse axis (e.g., a recombining unit).

In order to illustrate the change in beam geometry, an x-y-z coordinate system is adopted herein. The laser diode light emitting areas have their emission surfaces arranged on a straight line in a plane with their longitudinal axes (see surface a of FIG. 6). The orientation of the longitudinal axes defines the y-axis and the orientation of the transverse axes defines the x-axis in the coordinate system. In the x-y plane, aligned with and defining the plane of the emission surfaces of the laser diode, the beam geometry is determined by the arrangement of the emission surfaces and accordingly presents a vertically oriented stripe. The horizontal width of the stripe corresponds to the fast axis of the laser diode, while the vertical height of the stripe corresponds to the slow axis. In the drawing, real proportion and dimension ratios of the beam cross-section are not maintained.

An object of the invention is to propose and provide an optical means to divide a collimated laser diode beam into a plurality of similar parts or portions and to form with these portions a more symmetrical beam geometry (symmetric beams B of FIG. 6) thereby optimizing the coupling of the radiation into an optical fiber. The distance between the two output beams may be adjusted for optimum symmetry. For two (or more) laser diodes in the module, a single optical means can be used to rearrange the input beams, increasing the number of output beams by a factor of 2 compared to the input beams and forming the symmetrical beam geometry (FIG. 7).

BRIEF DESCRIPTION OF THE DRAWINGS

FIG. 1 is a schematic perspective view of a prior art apparatus for combining a plurality of laser beams;

FIG. 2 is a schematic perspective view of another prior art apparatus for combining a plurality of laser beams;

DESCRIPTION OF THE PREFERRED EMBODIMENT

Figure 8:
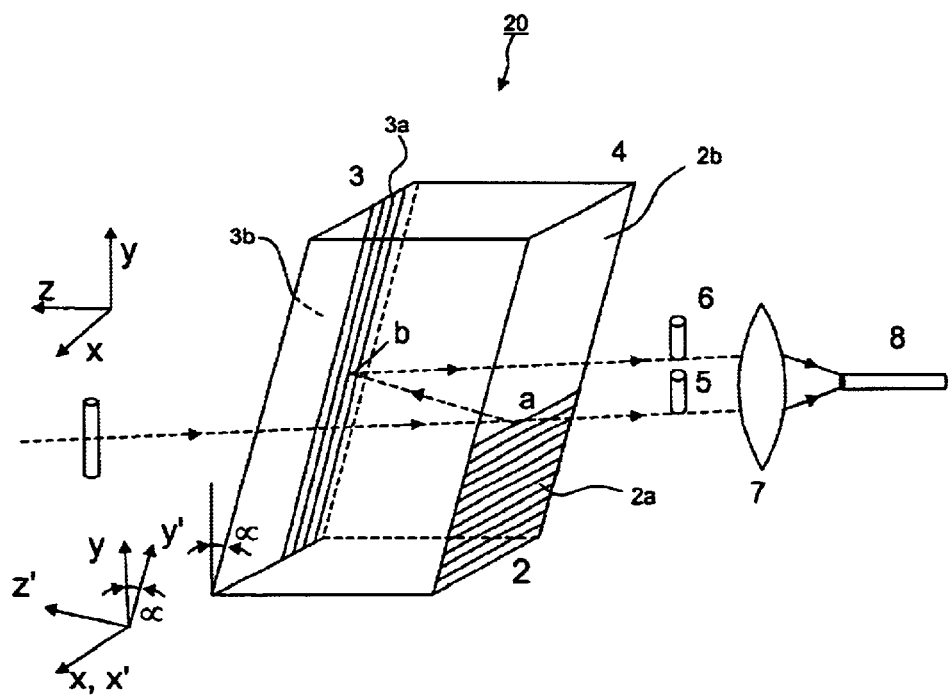
FIG. 8 is a diagram of an embodiment of the invention including optical mirrors for dividing and recombining collimated laser beams.

A first embodiment of the invention for a single laser diode is shown in FIG. 8. A collimated laser input beam 1 is obtained by a conventional collimating unit (not shown), which collimates the output radiation of a broad area laser diode in the x-direction using, for example, a single cylindrical lens. The actual laser diode light emitting area is not shown in the figure for simplicity, but is aligned with its slow axis parallel to the y-axis and the fast axis parallel to the x axis. For improved beam quality, the collimating unit can additionally consist of another cylindrical lens, which also collimates the radiation in the y-direction. Alternatively the collimating element can comprise non-cylindrical or non-spheric (e.g., aspherical) lenses or other optical elements and coatings to minimize optical aberrations. Generally, a beam combining unit can be inserted after the collimating unit and is not shown here.

FIG. 8 depicts one embodiment of optical means 20 for dividing and recombining of the collimated beams of the invention and may consist of two optical mirrors 2a and 3a arranged on two opposite surfaces 2 and 3 of a substantially parallel substrate 4 (i.e., a parallelepiped).

Optical means 20 may have dimensions suitable to the number, size, shape, and power levels of the laser input beam 1, typically 1 mm high by 5 mm wide and having a thickness of 1–2 mm. In this embodiment, mirrors 2a and 3a only partially cover substrate surfaces 2 and 3. That is, surface 2 is partitioned into upper and lower halves, the lower half being coated with an inwardly reflective material such as aluminum or silver forming mirror surface 2a, upper half 2b being optically clear to allow transmission therethrough. The composition of the material should be compatible with the nature of the radiation to be reflected, e.g., an optically reflective coating. Likewise, surface 3 is laterally bisected into left and right halves, left half surface 3b (as depicted for purposes of illustration in FIG. 8) being optically clear to provide for beam transmission into substrate 4, the right half having an internally reflective coating forming mirror surface 3a so as to reflect an internally propagated laser beam back into substrate 4. The two mirror surfaces 2a and 3a generate two substantially equal output beams 5, 6, shifted laterally with respect to each other. Note that mirror surfaces 2a and 3a are aligned orthogonally with respect to each other to minimize any beam clipping at the edges of the mirrors and to maximize the optical throughput through the substrate.

The depicted rhomboidal (or, more generally, parallelepipedal) form of the substrate is chosen to minimize the insertion loss of the substrate for a preferred polarization state of the input beam providing for an angle between the input beam and the input side of the substrate close to the Brewster angle. In a preferred embodiment, the Brewster angle is equal to:

$$\theta\alpha = \tan^{-1}\left[\frac{n_2}{n_1}\right]$$

where $n_1$ and $n_2$ are the refractive indices of the respective media. For example, if we consider substrate 4 to be made of typical crown glass having a nominal index of refraction of 1.52 in an air environment (air at standard pressure and temperature having an index of refraction of approximately 1.00), then the Brewster angle equals:

$$\theta\alpha = \tan^{-1}\left[\frac{1.52}{1.00}\right]$$
$$= 56.7°$$

If we assume an index of refraction of between 1.50 and 1.75 (the lower limit for crown glass, the upper limit corresponding to flint glass), we obtain a range of Brewster angles between 56 and 60 degrees.

The two surfaces 2 and 3 in conjunction similarly provide a substantial polarization sensitive loss. In principle, any other substrate form can be chosen as long as the two partially mirror coated sides of the substrate are substantially parallel to each other. However, only an input angle close to the Brewster angle (i.e., between 56 and 60 degrees) will enable polarization sensitive operation and eliminate the need for anti-reflection coating of the non-mirror coated surfaces 2 and 3 (i.e., the upper portion 2b of surface 2 and the left portion 3b of surface 3) to obtain a low insertion loss for the device.

Figure 8A:
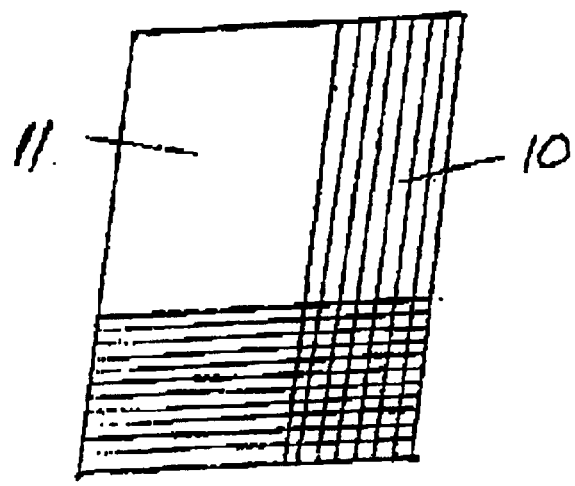
FIG. 8A is a diagram showing details of the mirrored surfaces of the embodiment of FIG. 8.

For optimum throughput the partially mirrored surfaces should ideally make an angle of 90° with respect to each other, i.e., if the substrate in-between the mirror surfaces 2a and 3a is removed and the two mirror surfaces 2a and 3a are laid one of top of each other, the resulting mirror-free surface should be a trapezoid with all sides smaller than all sides of surfaces 2 and 3, as illustrated in FIG. 8A.

Output beam 5 is generated by passing the upper part (preferably, the top half portion) of the input beam directly through the substrate. Output beam 6 is generated by reflecting the lower part of the input beam (e.g., the lower half portion) from mirror surfaces 2a and 3a. For substantially parallel mirror surfaces 2a, 3a output beams 5 and 6 are parallel with respect to each other and laterally shifted by a distance, which depends on the substrate thickness, angle α and also a rotation by an angle β in the tilted x'z' plane around the tilted y' axis as shown in FIG. 8. The orientation of the surface normal of surface 2 is then fully characterized by the angles α and β, where α characterizes the tilt of the x'y'z' coordinate system in the yz plane around the x axis. Note that for simplicity, the beam deflection due to refraction at the substrate/air interface is not shown.

Preferably, the angle between the surface normal of substrate side 3 and the input beam is chosen to be close to the Brewster angle to minimize the transmission loss of the substrate for a polarization state parallel to the y-axis. Moreover, operation near the Brewster angle minimizes back reflected light. Minimization of back-reflected light is important to optimize the amplitude stability of the diodes and to maximize their life-time.

Assuming β=0 for simplicity, the incident beam 1 is reflected at mirror 2 and is directed towards mirror 3, where the line ab (FIG. 8) is at an angle 2α with respect to the direction of the incident beam. After reflection at mirror 3, the beam propagates in the direction parallel to the propagation trajectory of the incident collimated beam 1. Two similar halves 5 and 6 of the initial collimated beam 1 are thus formed during propagation through the substrate. As shown, the beams are localized one on top of the other in the direction of the y axis.

Figure 3:
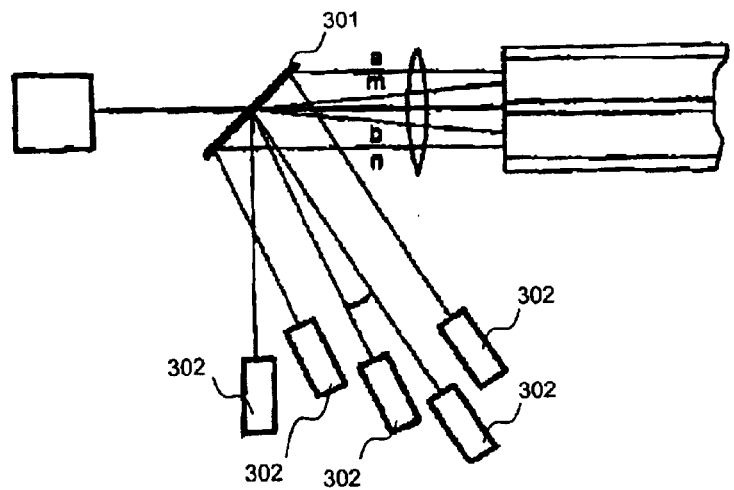
FIG. 3 is a schematic view of a prior art pump system for an optical fiber amplifier using dichronic mirrors.
Figure 4:
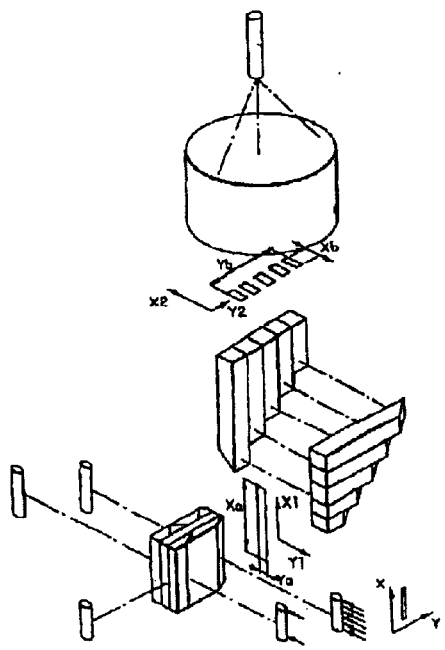
FIG. 4 is a schematic view of a prior art device that divides and recombines the collimated beams from several laser diodes to obtain a more symmetrical output beam.
Figure 5:
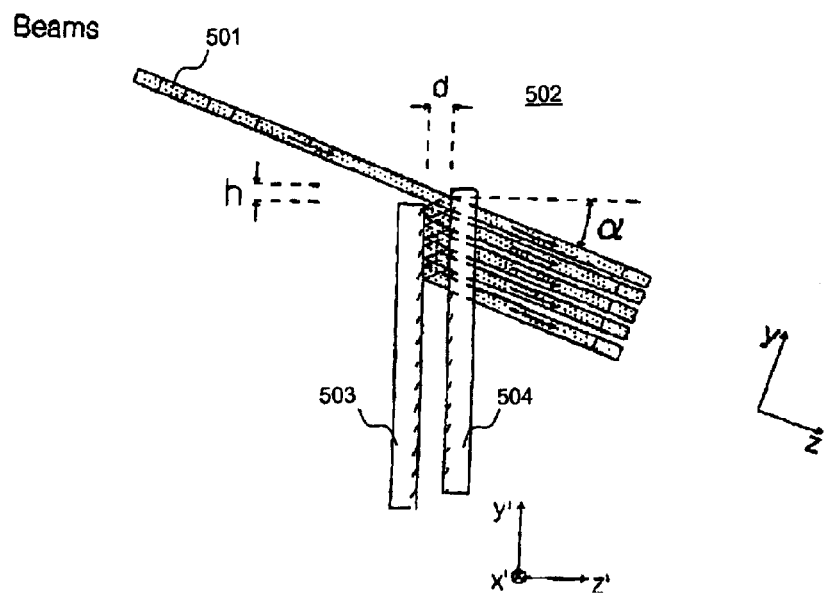
FIG. 5 is a schematic side view of a prior art beam shaping device using two substantially parallel mirrors.
Figure 6:
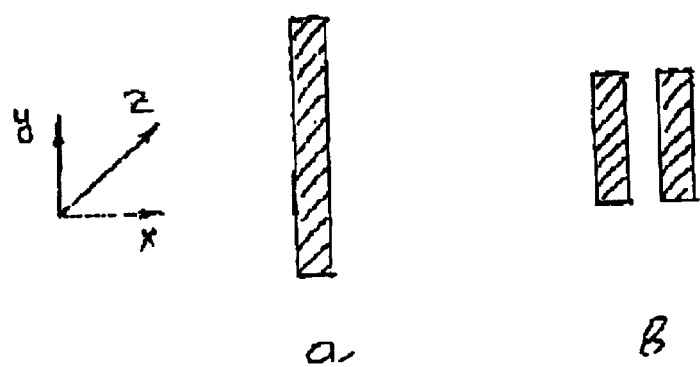
FIG. 6 is a schematic diagram of a laser diode light emitting area configuration with a symmetrical beam geometry illustrated in an x-y-z coordinate system.
Figure 9:
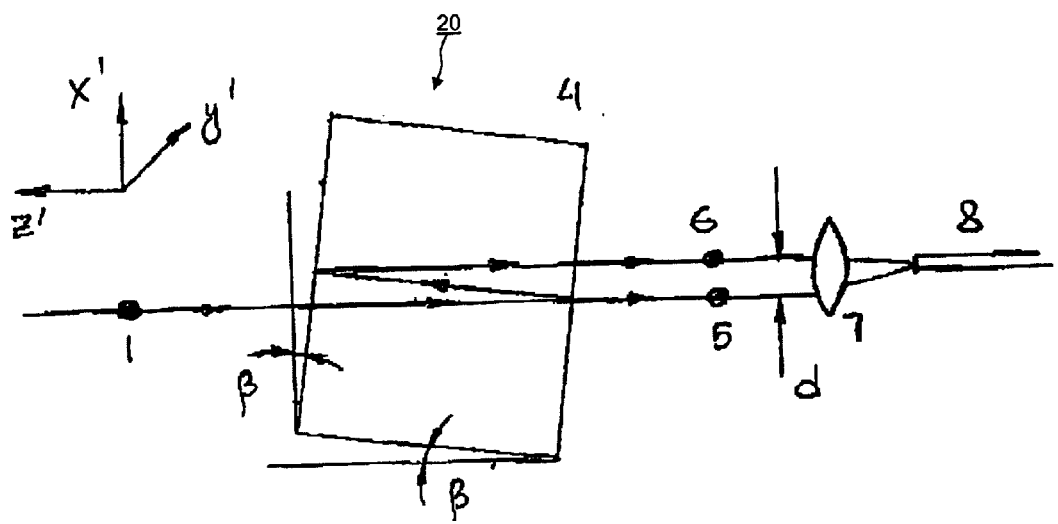
FIG. 9 is a diagram of the embodiment of FIG. 8 including focusing optics coupling the beam into an optical fiber.

To recombine the two halves of the initial beam and to form a symmetrical light picture (similar to the one in FIG. 6), the substrate orientation in the x'z' plane must be adjusted. FIG. 9 represents a top view of the proposed design looking down along the y' axis. The angle β may be changed to adjust the lateral separation d between the two output beams.

The focusing optics 7 which couples the beam bundle into an optical fiber 8 is shown in FIGS. 8 and 9. Standard optics may be used to couple light into an optical fiber with a round fiber core.

Figure 7:
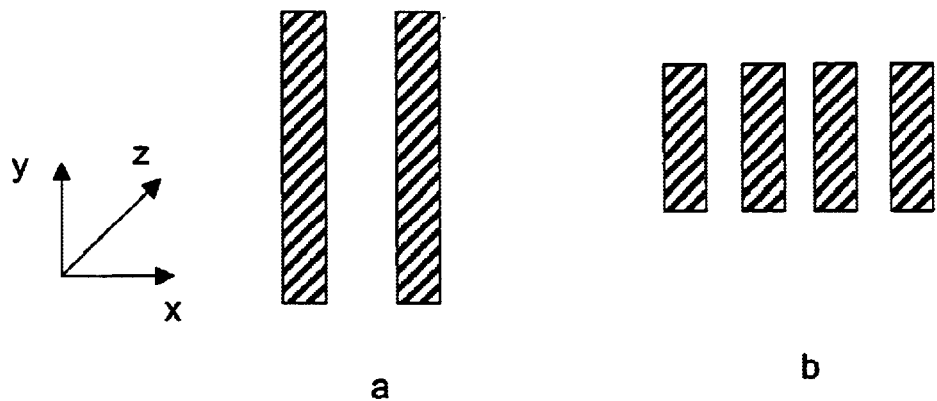
FIG. 7 is a schematic diagram of a configuration similar to that shown in FIG. 6 including two laser diodes in a module.
Figure 10:
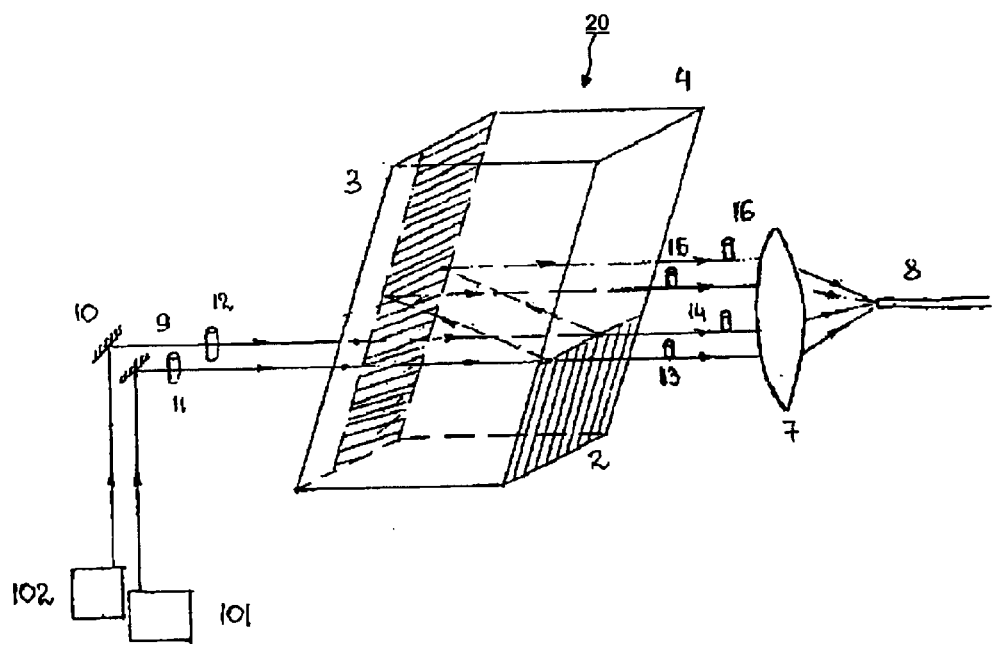
FIG. 10 is a diagram of an embodiment of the invention including multiple laser diodes and means for combining the collimated beams.

A second embodiment shown in FIG. 10 differs from the first embodiment only with respect to the number of laser diodes and means for combining the collimated beams by means of a side-by-side arrangement in the direction of the transverse axis of the beams (combining unit). Two additional discrete mirrors 9 and 10 are used to align two independent collimated beams 11 and 12 from two laser diodes 101 and 102 into dividing/combining unit 20. To keep the overall optical path lengths for the two laser diodes equal, the distance of the laser diodes to the mirrors should be shorter for diode 102 compared to diode 101. Four halves 13-16 of the initial two collimated beams are obtained at the output of this unit and they may be arranged as indicated in FIG. 7, i.e., laterally spaced along the x axis. Standard optics can be used to couple the symmetric beam pattern into an optical fiber.

To simplify the optical alignment of the beams, an additional pre-focusing lens can be inserted in-between the laser diodes and the beam dividing/combining unit 20 in FIG. 10. Such an optical arrangement is not separately shown. In this case, the beam dividing/combining unit can be positioned near the focus of the pre-focusing lens. The pre-focusing lens and the second focusing lens 7 thus constitute an optical telescope. The focal lengths of these two lenses and their separation can then be selected to ensure optimum focusing into a fiber device 8.

The invention may be used for any number N of laser diode collimated beams to form 2N output beams and to couple all of them into a single output optical fiber to obtain a beam with high brightness. Then, too, a series of multiple dividing/combining units 20 may be provided in tandem to further redistribute the laser beams from a geometry elongated along the slow axis to a more symmetric geometry.

Figure 11:
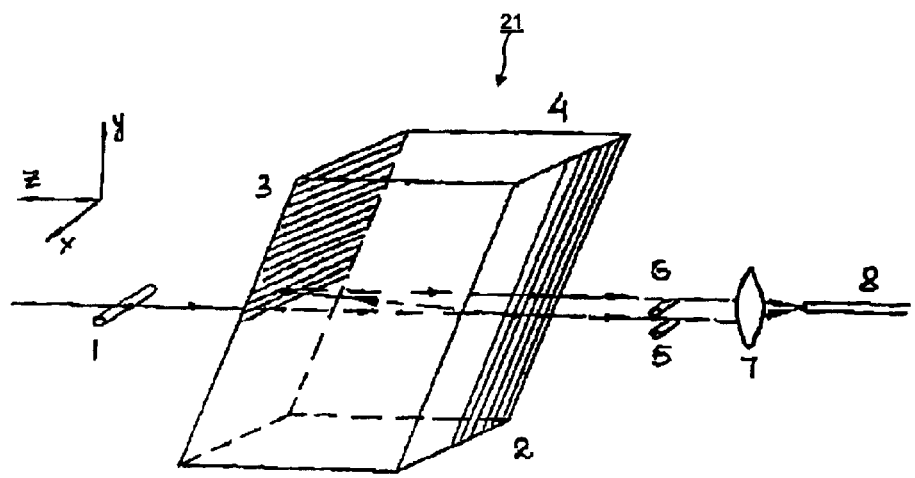
FIG. 11 is a diagram of the another embodiment of the invention including an alternative orientation of mirrors.

In all embodiments described above the longitudinal axis orientation of the collimated laser diode beams was parallel to the y-axis. Of course, orientation of the beams with respect to the substrate and partially mirrored surfaces thereof is relative. With reference to FIG. 11, in a third embodiment this orientation coincides with the orientation of the x-axis. In this embodiment, dividing/combining unit 21 is reversed to accommodate a 90 degree rotation of the laser beam slow and fast axes. Again, the case of a single laser diode is considered in this example for simplicity. As one skilled in the art would recognize, the only difference compared to the previous embodiments is the orientation of the mirrors 2a and 3a as it is shown in FIG. 11. Thus, the alternative orientation may be achieved, for example, by rotating the dividing/combining unit from the previous embodiments by 90 degrees. The same coupling optics 7 may be used at the output.

Figure 12:
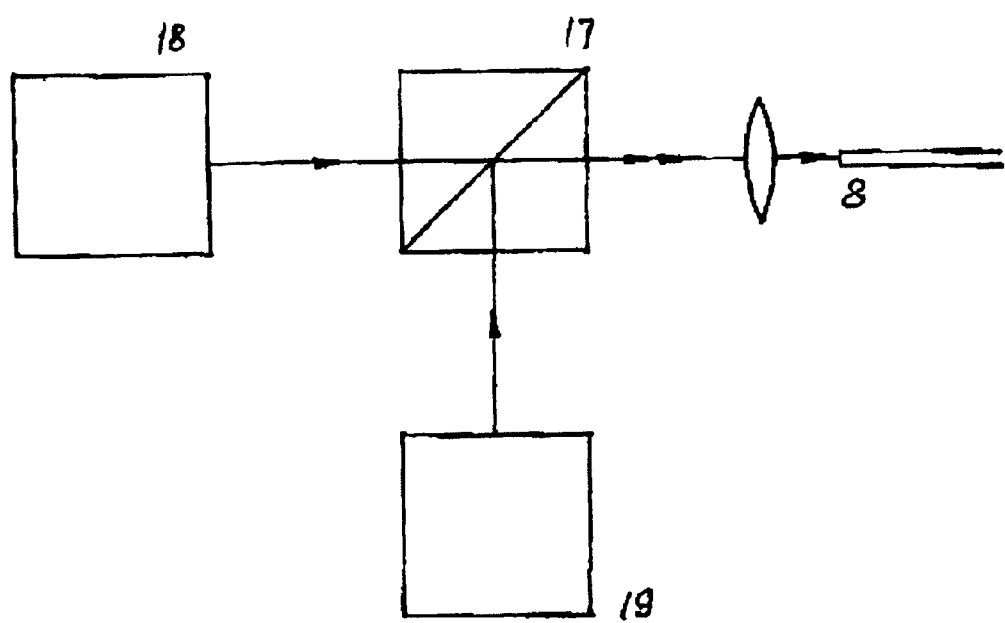
FIG. 12 is a diagram of another embodiment of the invention including polarization multiplexing of two devices with orthogonal polarization.

A fourth embodiment depicted in FIG. 12 shows polarization multiplexing of two proposed devices with orthogonal polarizations. In this configuration, polarizing cube 17 combines the radiation from two units 18 and 19. Units 18 and 19 have an optical scheme similar to the one from FIG. 8; or alternatively an optical scheme similar to FIG. 11. The optical power coupled into an optical fiber 8 can thus be doubled.

What is claimed is:

1. A method of beam shaping radiation from a laser diode comprising the steps of:

receiving a laser beam into an optical element through an input surface;

partitioning said laser beam along a longitudinal axis thereof into first and second longitudinal portions by internally reflecting said first longitudinal portion with a mirrored portion of an output surface of said optical element and transmitting said second longitudinal portion out of said optical element through an optically transmissible portion of said output surface;

internally reflecting said first longitudinal portion of said laser beam with a mirrored portion of said input surface so as to cause said first longitudinal portion to be propagated toward said output surface substantially parallel to and laterally shifted from, said second longitudinal portion, said mirrored portion of said output surface oriented orthogonal to said mirrored portion of input surface; and transmitting said first longitudinal portion out of said optical element through said output surface.

2. An optical system for beam shaping the radiation of one or more laser diode output beams comprising:

at least one laser diode configured to provide an output radiation in the form of a laser beam with a cross section in an emission plane having a longitudinal axis substantially larger than a transverse axis;

means for collimating said laser beam from said laser diode to provide a collimated laser beam;

means for splitting the collimated laser beam in the direction of the longitudinal axis into a plurality of partial beams to provide side-by-side partial beams;

means for recombining the side-by-side partial beams along the direction of the transverse axis of the diode to provide recombined beams;

means for minimizing back reflections into the diode from said splitting and recombining means; and means for providing a polarization sensitive transmission for said splitting and recombining means, said means for splitting and recombining having mutually orthogonal reflective surfaces.

3. The optical system according to claim 2, where the means for splitting, recombining, minimization of back reflections and means for providing polarization sensitive transmission is a single monolithic optical element with partially mirror coated surfaces, defining an input and output surface.

4. An optical system according to claim 3, where the single monolithic optical element is of a parallelepipedal form with said input and output surfaces substantially parallel with respect to each other.

5. An optical system according to claim 4, where said input and output surfaces of the rhomboidal form are partially mirror coated, such that when the two mirror coated surfaces are overlaid one on top of each other, the resulting mirror free surface area is a trapezoid with all four sides shorter than the sides of the input and output surfaces of the parallelepipedal form.

6. The optical system according to claim 4, wherein the parallelepipedal form comprises two partial mirrors formed on said input and output surfaces, respectively, to allow transmission of incident and reflected beams; a longitudinal axis of an input beam and a first one of said mirrors oriented in a manner to bisect the input beam into two portions, one of said portions of the input beam propagating in the same direction and the second portion reflected into a direction of a second one of said mirrors, said second mirror configured whereby, after reflection from the second mirror, said two portions of said beam are oriented side by side along the transverse axis of the input beam.

7. The optical system according to claim 2 further comprising:

another laser diode;

means for collimating a laser beam from said other laser diode;

means for combining the collimated laser beams from said laser diodes into a side-by-side orientation along transverse axes of said laser diodes to provide said collimated radiation; and means for introducing an optical path delay between the diodes.

8. An optical system according to claim 2, further comprising means to couple the recombined beams into an optical element.

9. An optical system according to claim 8, where the optical element comprises an optical fiber.

10. An optical system according to claim 8, where the optical element comprises a fiber having a cross section doped with a rare-earth element.

11. The optical system according to claim 2, wherein the means for collimating comprises an individual cylindrical lens, which collimates the laser beam of the laser diode in the direction of the transverse axis.

12. The optical system according to claim 2, wherein the collimating means comprises a lens system configured to collimate the laser beam of the laser diode in the direction of the longitudinal and transverse axes.

13. The optical system according to claim 2, wherein the means for combining comprises optical mirrors.

14. The optical system according to claim 2 further comprising an optical telescope configured to focus said recombined beams into an optical fiber.

15. An optical system for beam shaping the radiation of one or more laser diode output beams comprising:

at least one laser diode configured to provide an output radiation in the form of a laser beam with a cross section in an emission plane having a longitudinal axis substantially larger than a transverse axis;

means for collimating said laser beam from said laser diode to provide a collimated laser beam:

first and second means for splitting the collimated laser beam in the direction of the longitudinal axis into a plurality of partial beams to provide side-by-side partial beams; and first and second means for recombining the side-by-side partial beams along the direction of the transverse axis of the diode to provide recombined beams, said means for splitting and recombining having mutually orthogonal reflective surfaces; and means for receiving the radiations from both of said recombining means with orthogonal polarizations and configured to provide respective output laser beams that are combined by means of a polarization multiplexing device to double an output power.

16. An optical system for beam shaping the radiation of laser diode output beams comprising:

first and second laser diodes each configured to provide an output radiation in the form of a laser beam with a cross section in an emission plane having a longitudinal axis substantially larger than a transverse axis;

means for collimating said laser beams from said first and second laser diodes to provide collimated laser beams;

first and second means for splitting said collimated laser beams in the direction of the respective longitudinal axes into respective pluralities of partial beams to provide first and second side-by-side partial beams;

first and second means for recombining said first and second side-by-side partial beams along the direction of the transverse axes of the laser diodes to provide respective first and second recombined beams, said means for splitting and recombining having mutually orthogonal reflective surfaces; and a polarization multiplexing device receiving both of said recombined beams with mutually orthogonal polarizations and configured to provide output laser beams.

* * * * *